(No Model.) 2 Sheets—Sheet 2.
D. M. MAXON.
CONVEYER.
No. 540,617. Patented June 4, 1895.
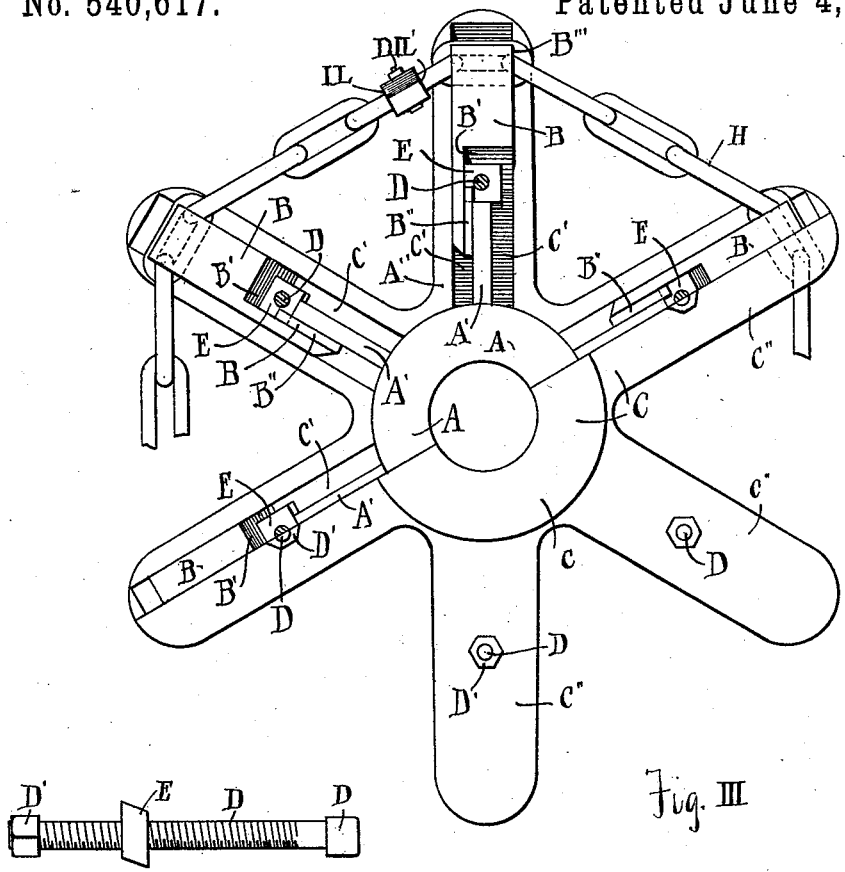
Fig. III
Fig. VII.
WITNESSES:
INVENTOR
Daniel M Maxon
BY
ATTORNEY

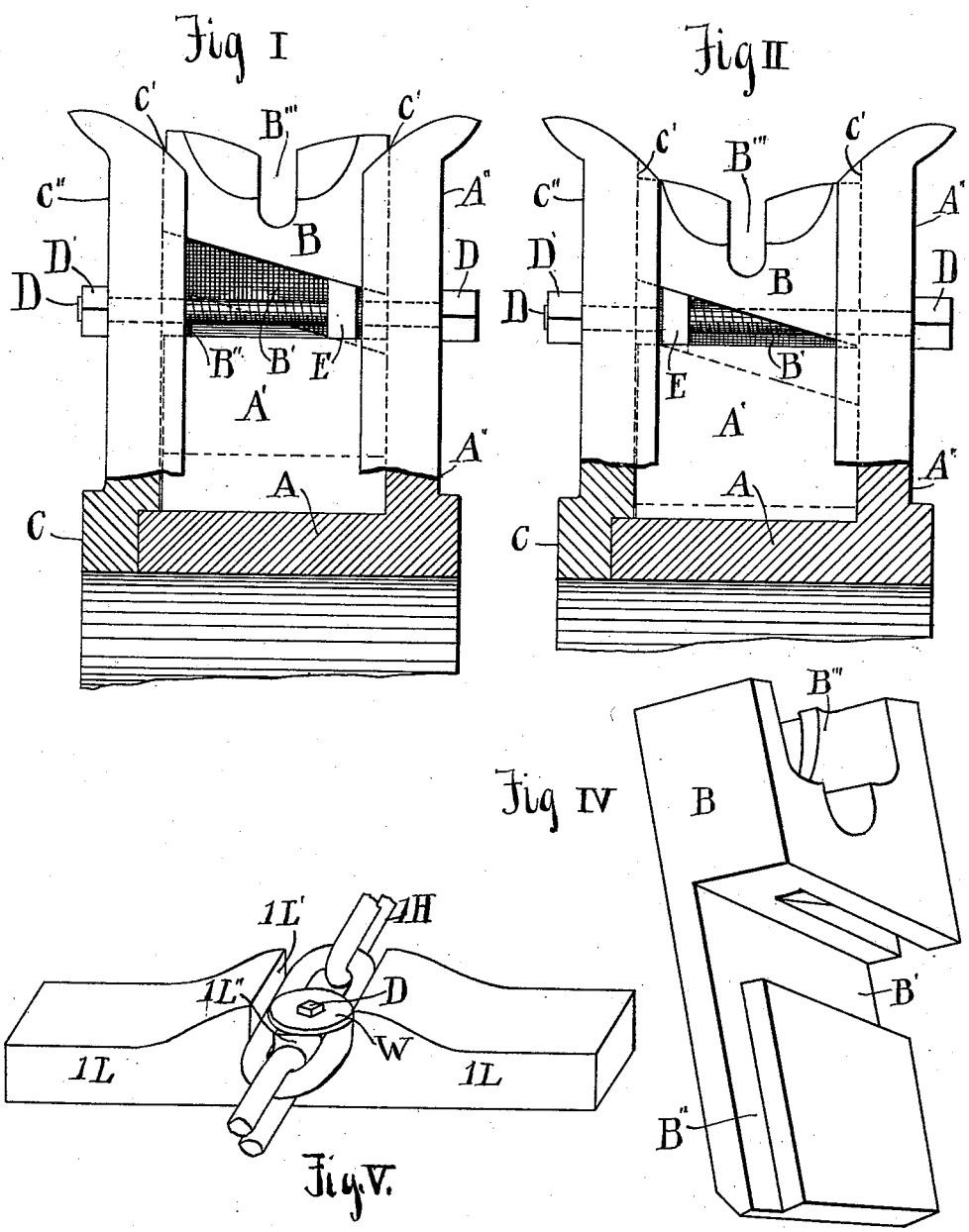

UNITED STATES PATENT OFFICE.

DANIEL M. MAXON, OF BAY CITY, MICHIGAN, ASSIGNOR TO ANNIE MAXON.

CONVEYER.

SPECIFICATION forming part of Letters Patent No. 540,617, dated June 4, 1895.

Application filed May 26, 1894. Serial No. 512,546. (No model.)

*To all whom it may concern:*

Be it known that I, DANIEL M. MAXON, a citizen of the United States, residing at Bay City, in the county of Bay and State of Michigan, have invented certain new and useful Improvements in Conveyers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to conveyers, and consists in the peculiar construction, arrangement, and combination of the parts, as shown and described.

Figure I is a side elevation of the wheel and adjustable sprocket, in part sectional. Fig. II is the same view showing the adjustable sprocket in a different position. Fig. III is a side elevation of the sprocket-wheel, in part sectional. Fig. IV is a perspective of the adjustable sprocket. Fig. V is a perspective of the means for securing a flight to the chain. Fig. VI is a vertical section of Fig. V, and Fig. VII is a view of the bolt D and the nut thereon holding and operating the sprocket.

In the drawings, A is the hub of the sprocket wheel and has upon one side the spoke A″ with a narrow portion or rib A′ extending across the hub to the removable part C. The spoke A″ contains the guides C′ adapted to receive the adjustable sprocket B. Upon the opposite side of the wheel from the spoke A″ is a removable part C fitting on the same shaft and having an annular recess on the inside into which the end of the hub A passes when C is secured to it. The part C is also provided with spokes C″ which have guides C′ similar to guides C′ of the spoke A″, to receive the sprockets B. The bolts D pass through these spokes A″ and C″ and the sprockets B, clamping them together as well as holding the sprockets.

B, as previously stated, is the adjustable sprocket. Its form and shape are shown in Fig. IV. On the sides of its outer end are the recesses B‴ for receiving the ends of the links of the conveyer chain as it passes over the sprockets. It will be observed that sprockets B have a depending flange B″ extending across one side thereof, and the flange is provided with an oblique groove B′ extending from near the lower inner edge of the flange across the flange obliquely to the top of the flange on the other side thereof. This groove has rectangular sides and is adapted to receive a square traveling nut E on the screw threaded bolt D.

When the sprockets B are placed in the wheel the flange B″ passes at one side of the rib A′ of the hub A, the bolt D being just above the rib A′ with the nut E on the bolt in the upper end of the oblique groove B′. It is obvious that with the nut D′ loosened, turning the bolt D in the proper direction will draw the nut E to the opposite side of the sprocket, and that in traveling in the oblique groove B′ it will push the sprocket along it, thereby adjusting the sprocket and taking up the slack in the chain.

In Figs. V and VI I have illustrated a means of securing a flight to the chain. This means is simple and preferable.

l L is the flight having a recess l L′ extending below the middle of the depth of the flight. In the center of this recess is a rib L″ extending upward to near the top surface of the flight and adapted to fit within the horizontal link of the conveyer chain. The center of this rib is provided with a screw threaded hole. W is a washer placed over the top of the rib and link, covering the link within the conveyer. A bolt D passes through a hole in the center of the washer into the hole in the center of the rib l L″ and thereby rigidly holds the link in the recess of the flight.

It will be observed that the means described for securing the flight to the chain is adapted to engage the horizontal link only, thus making it possible to use the flight on a sprocket wheel formed as described herein, for as seen, the sprocket engages the vertical link, and it would be impossible to use on this wheel a flight secured to a vertical link.

Having thus described my invention, what I claim as new, and desire to secure by Letters Patent, is—

1. In a conveyer, the combination, with a chain and a flight secured to the horizontal link of the chain, of a sprocket wheel consisting of a wheel having a removable part, each part having spokes parallel, the sprockets adjustably secured between each side of the parallel spokes, the sets of spokes being far enough apart to allow the flight to hang between them, and means for adjusting the sprockets, substantially as and for the purpose set forth.

2. A sprocket wheel for a conveyer of the class described consisting of a hub, and having spokes upon one end thereof, guides C' in the spokes and a narrow portion A' extending across the hub in line with the center of each spoke and integral with the hub, and a removable part fitting over the end of the hub having spokes parallel with the spokes of the hub and having similar guides, and sprockets B fitting in the guides, and bolts passing through the spokes of the hub and the spokes on the removable part and the sprocket between them, and nuts on said bolts fitting the grooves of the sprockets, substantially as described.

3. In a sprocket wheel, the combination, with the hub, spokes on the end of the hub, ribs across the hub in line with the centers of the spokes, and both integral therewith, a removable part fitting on the end of the hub and having the spokes integral therewith and parallel with the spokes in the hub, guides in the spokes, of the sprockets B fitting into guides and over ribs, each sprocket having a diagonal groove, a nut within the diagonal groove on a screw threaded bolt, the screw threaded bolt in the diagonal groove clamping the spokes to the sprocket, substantially as described.

4. In a sprocket wheel, adjustable sprockets adapted to fit into guides in the spokes of the wheel, the sprockets having each a diagonal groove adapted to receive a traveling nut, and a bolt passing through the diagonal groove and carrying the traveling nut, and engaging the spokes of the wheel, substantially as specified.

5. In a conveyer, the combination with the conveyer chain, of the flight provided with a transverse recess adapted to receive a horizontal link of the chain and having a rib in the center of the recess fitting into the link, a washer above the link, a screw passing through the washer and entering the rib, thereby holding the link in the recess, substantially as described.

In testimony whereof I affix my signature in presence of two witnesses.

DANIEL M. MAXON.

Witnesses:
A. H. SWARTHOUT,
J. A. O'KEEFE.